March 3, 1953 F. J. KAMPHOEFNER 2,630,528

PANORAMIC RECEIVER FREQUENCY SETTING MEANS

Filed March 26, 1946

INVENTOR
FRED J. KAMPHOEFNER
BY
William D. Hall
ATTORNEY

Patented Mar. 3, 1953 2,630,528

UNITED STATES PATENT OFFICE 2,630,528

PANORAMIC RECEIVER FREQUENCY SETTING MEANS

Fred J. Kamphoefner, San Francisco, Calif., assignor to the United States of America as represented by the Secretary of War Application March 26, 1946, Serial No. 657,150

1 Claim. (Cl. 250—20)

This invention relates generally to radio apparatus and particularly to panoramic search receivers.

In one known type of panoramic search receiver an incoming radio-frequency signal is heterodyned with a local oscillator signal and the resulting intermediate-frequency signal is passed through a wide band i-f amplifier to a mixer stage, where it is heterodyned with the output of a sweeping oscillator. The resulting frequency spectrum is presented as a panoramic display on an oscilloscope which has a sweep synchronized with the frequency variation of the sweeping oscillator. In apparatus of this character it is desirable that the panoramic presentation indicate whether or not the receiver is exactly tuned to the frequency of the incoming signal.

An object of the present invention therefore is to cause a distinctive indication to be presented on the oscilloscope of a panoramic search receiver whenever the receiver is exactly tuned to the frequency of the incoming signal.

A further object is to provide a means for tuning the search receiver to a given signal in which the tuning accuracy is not dependent upon the indicator frequency calibration.

Figure 1:
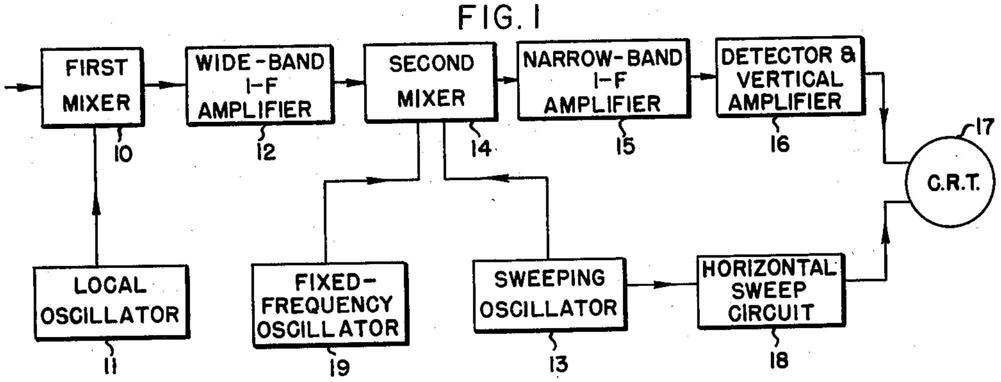
Figure 2:
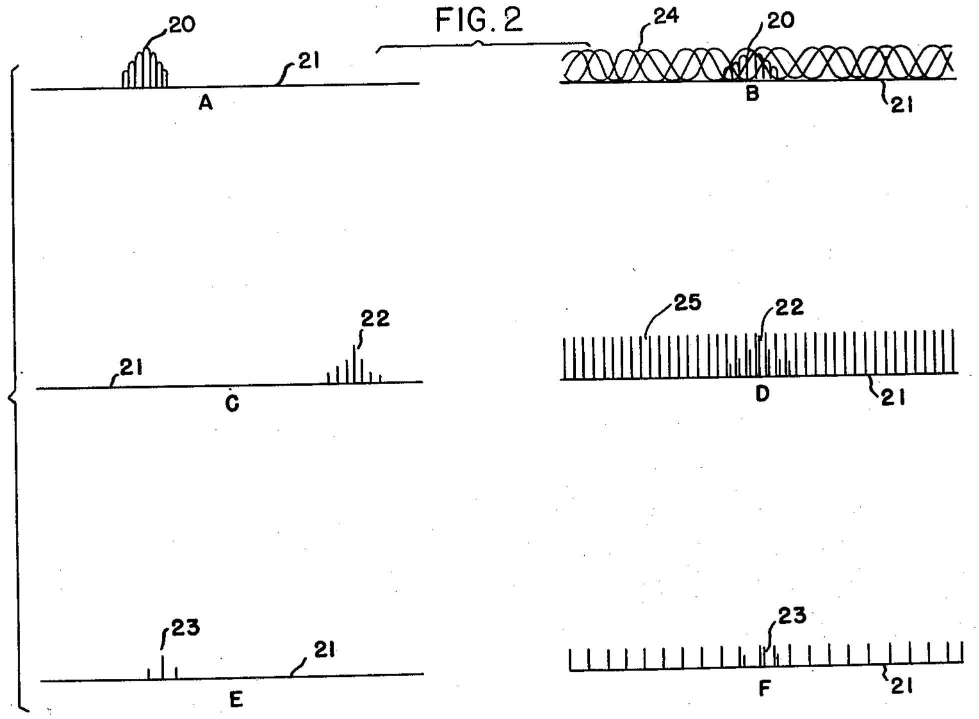

Other objects, features and advantages of this invention will suggest themselves to those skilled in the art and will become apparent from the following description of the invention taken in connection with the accompanying drawing in which:

Fig. 1 is a block diagram of a panoramic receiver in accordance with the present invention; and Fig. 2 comprises several views of indicator presentations which are obtained under various assumed operating conditions.

Referring to Fig. 1, the invention is adapted to be used in conjunction with a superheterodyne receiver which includes a first mixer 10 where the incoming radio frequency signal is combined with the output of a local oscillator 11. The output of the mixer 10 is delivered to a wide-band i-f amplifier 12 which has substantially constant gain over a predetermined wide band of frequencies. A sweeping oscillator 13 is provided, the frequency of which is varied continuously throughout a given range of frequencies. The outputs of the amplifier 12 and oscillator 13 are combined in a second mixer 14, and the resulting signal is passed through a narrow-band i-f amplifier 15. The effect is to cause narrow segments of the pass band of the wide-band amplifier 12 to be selected in sequence as the sweeping oscillator 13 goes through its cycle of operation. Signals which are passed through the narrow-band amplifier 15 are detected and amplified by the detector and vertical amplifier 16 and are applied to the vertical deflecting elements of a cathode ray tube 17. The horizontal sweep circuit 18 of the cathode ray tube 17 is controlled by the sweeping oscillator 13 so that the horizontal sweep of the indicator 17 is synchronized with the sweep of the oscillator 13. As a result there appears on the indicator 17 a panoramic display of incoming radio signals within a selected broad band of frequencies.

Various schematic views of types of signal presentation which may be obtained on the indicator 17 are illustrated in Fig. 2. These views have been modified in some instances from the presentations which may actually occur. This has been done for the sake of clarity. Noise effects have also been omitted. In Fig. 2A, for example, there is shown a display of a sine-wave modulated signal, the lateral position of the signal indication 20 along the base line 21 being indicative of the frequency of the incoming radio signal. The indicator may be calibrated to enable the frequency of the incoming signal to be determined from its lateral position on the viewing screen. Heretofore, it has been the practice to rely upon this calibration in determining whether or not the receiver is accurately tuned to the incoming signal.

In Fig. 2C there is represented an indication which may be obtained from a pulse-modulated signal of average strength. In Fig. 2E the indication 23 is that of a weak pulse-modulated signal having a relatively low pulse repetition frequency, the measurement of such signal frequencies being especially difficult by the usual methods. Assuming that the center of the base line 21 represents, in each instance, the frequency to which the receiver is tuned, it will be noted in Figs. 2A and 2E that the incoming signal frequency is below the receiver tuning whereas in Fig. 2C the incoming signal frequency is above that of the receiver tuning.

Referring again to Fig. 1, it is proposed now to provide a fixed-frequency oscillator 19, the output of which is fed to the second mixer 14. The frequency of the oscillator 19 is such that, if the receiver is accurately tuned to an incoming signal, the output of the oscillator 19 mixes with the signal passed by the wide-band i-f amplifier 12 to furnish the signal which will be passed by the narrow-band i-f amplifier 15. It should be evident that this signal will be applied to the vertical deflecting elements of the cathode ray tube 17 continuously so long as the incoming signal is maintained; that is to say, the signal indication is not a function of the horizontal sweep of the indicator. In the case of the sine-wave modulated signal assumed in connection with Fig. 2A, the i-f signal set up by the fixed-frequency oscillator 19 appears on the indicator as pattern 24 in addition to the usual normal panoramic display. Fig. 2B shows both of these signals separately for the sake of clarity. However, it will be seen that in practice the signals from fixed-frequency oscillator 19 and the panoramic signal, during the periods they both coincide, will produce one resultant signal. Since there is no frequency relationship between the two component signals, their resultant will vary in a random manner between the difference and the sum of the two component signals. In any case, the presence of this pattern 24 extending entirely across the base line 21 of the indicator tube 17 indicates that the receiver is tuned exactly to the frequency of the incoming radio signal. If the receiver tuning is above or below the incoming signal frequency, the panoramic display appears without the superimposed pattern, as represented in Fig. 2A.

In the case of the pulse-modulated signal, Fig. 2C, coincidence of incoming signal frequency and receiver tuning is indicated by the presence of a superimposed pattern 25 as shown in Fig. 2D. Similarly, the weak pulse-modulated signal pattern, Fig. 2E, assumes the appearance of the pattern shown in Fig. 2F when the receiver is tuned to the incoming signal frequency.

The receiver can be made to function as an ordinary panoramic receiver merely by switching off the fixed-frequency oscillator 19, or as a narrow-band non-panoramic receiver by turning off the sweeping oscillator 13 and leaving the fixed-frequency oscillator 19 in operation.

While there has been described what is at present considered to be the preferred embodiment of this invention, it will be obvious to those skilled in the art that various changes and modifications may be made therein without departing from the scope of the invention.

The invention claimed is:

In a panoramic receiver, a wide-band intermediate-frequency amplifier, a sweeping oscillator, a mixer, means applying the outputs of said wide band amplifier and said sweeping oscillator to said mixer, a narrow-band intermediate-frequency amplifier, means applying the output of said mixer to said narrow-band amplifier, an indicator having a sweep circuit, means applying the output of said sweeping oscillator to said sweep circuit to effect the synchronization thereof, means applying the narrow-band intermediate-frequency signal to said indicator, a fixed-frequency sine-wave oscillator producing a signal having a frequency that will beat with a signal having the mid-frequency of the output of said wide-band amplifier to produce a signal of a frequency within the pass band of said narrow-band amplifier, and means applying the output of said fixed-frequency oscillator to said mixer, whereby an indication distinct from the normal panoramic presentation is afforded whenever the receiver is accurately tuned to the carrier of an incoming radio-frequency signal.

FRED J. KAMPHOEFNER.

REFERENCES CITED

The following references are of record in the file of this patent:

UNITED STATES PATENTS

| Number | Name | Date |
|---|---|---|
| 2,084,760 | Beverage | June 22, 1937 |
| 2,189,457 | Archer | Feb. 6, 1940 |
| 2,367,907 | Wallace | Jan. 23, 1945 |
| 2,381,940 | Wallace | Aug. 14, 1945 |
| 2,387,685 | Sanders | Oct. 23, 1945 |
| 2,416,346 | Potter | Feb. 25, 1947 |
| 2,455,052 | Fisher | Nov. 30, 1948 |
| 2,520,138 | Frink | Aug. 29, 1950 |